INVENTOR.
WILLIAM A. RAY
BY
John Flam
ATTORNEY

March 1, 1955   W. A. RAY   2,703,095
FLUID CONTROL SAFETY VALVE FOR GASEOUS FUELS
Filed Dec. 27, 1949   4 Sheets-Sheet 3

INVENTOR.
WILLIAM A. RAY
BY
John Flam
ATTORNEY

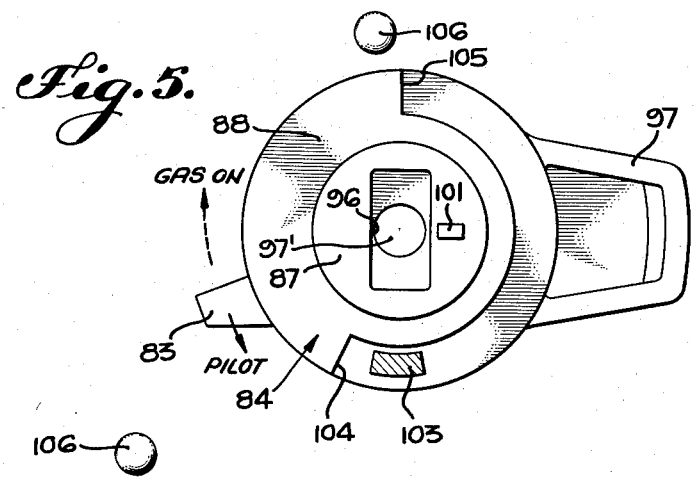
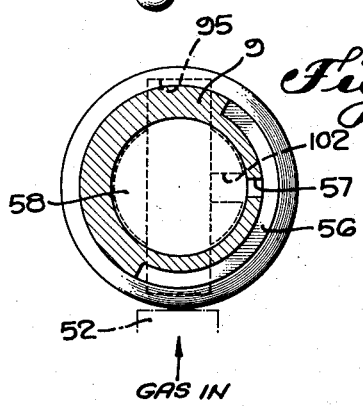
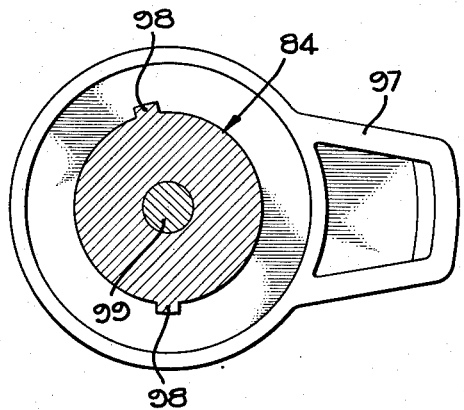
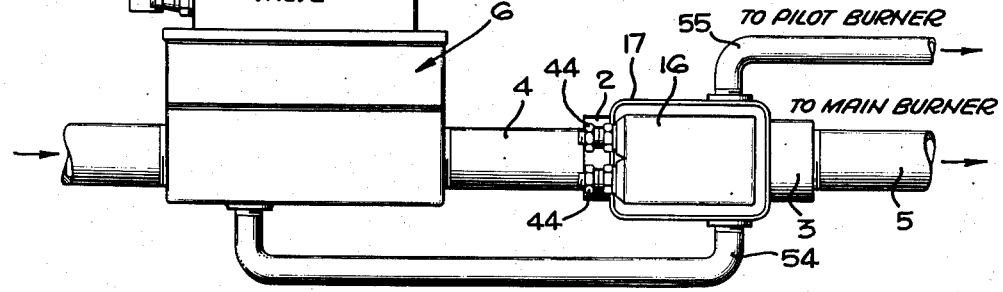
INVENTOR.
WILLIAM A. RAY
BY John Flam
ATTORNEY

United States Patent Office 2,703,095
Patented Mar. 1, 1955

2,703,095

FLUID CONTROL SAFETY VALVE FOR GASEOUS FUELS

William A. Ray, North Hollywood, Calif., assignor to General Controls Co., a corporation of California Application December 27, 1949, Serial No. 135,117

24 Claims. (Cl. 137—66)

This invention relates to automatic safety valves that are adapted to control the flow of fuel to a burner. Such a valve is shown and claimed in an application filed on December 14, 1948, under Serial Number 65,113, in the name of William A. Ray, and entitled: Safety Control Fuel Valve, now Patent No. 2,624,358, issued January 6, 1953. In general, the present valve structure is similar to that shown in said prior application.

When fuel is supplied to a burner used for space heating, or water heating, or any other purpose, the burner is usually intermittently operated. Accordingly, a pilot burner is provided that is intended to be continuously in existence. It is now common to provide a safety device or valve that interrupts the flow of fuel to the burner upon failure of the pilot flame.

In one form of such safety valve, a thermocouple is influenced by the heat of the flame for generating electrical energy. While the pilot flame is in existence, the safety valve is held open by an electromagnet supplied with energy from the thermocouple. Upon flame failure, the safety valve is released, and the flow of fuel is interrupted. A biasing spring is usually employed to urge the valve to the closed position.

In order to reset the safety valve, the safety valve closure is opened manually; and, at the same time, the armature for the electromagnet (which is connected to the safety valve closure) is also moved to attracted position. The pilot can now be lighted and, in a few seconds, the electromagnet is energized to hold the safety valve open, so that it is no longer required manually to hold the closure in open position.

The electromagnet, while strong enough to hold the armature in attracted position, and thereby to hold the safety valve closure open, is too weak to attract the armature. Therefore, an extraneous means, such as manual manipulation, is required to move the valve closure to open position.

Provisions are now commonly made to ensure that no gas is supplied to the main burner during the resetting operation. In this way, copious flow of unignited gas, with its attendant dangers, is prevented. In the prior application hereinabove referred to, a shut-off plug valve is provided to accomplish this result. The manual operation of moving the plug to closed position, and slightly beyond it, serves, as well, to open the safety valve. After the pilot flame is established, the plug can be rotated to open position.

When the plug is thus rotated during the resetting operation, the friction opposing plug rotation may be effective to hold the safety valve open even after the manual force is removed, and even if the pilot flame is not established. In order to ensure against such an occurrence, the manual operator has a loose, or lost-motion, connection with the plug. When this operator is released, spring pressure is used to take up this lost motion; and the friction on the plug is ineffective to prevent return of the safety valve to closed position upon pilot flame failure.

It is one of the objects of this invention to improve and simplify, in general, a valve of this character.

The manual handle and the plug are intended for rotation on a common axis. However, a slight misalignment often occurs. Under such circumstances, when the handle operates the plug to rotate it, a binding effect is encountered that may produce uneven wear of the plug and attendant increased resistance to turning. It is another object of this invention to prevent such misalignment from interfering with the free rotation of the plug.

It is still another object of this invention to provide a complete shut-off for the pilot burner, as well as for the main burner, in the event of pilot flame failure, and especially by the aid of a simple structure. To effect this result, the flow of pilot gas through the valve is made entirely separate from the flow of gas to the main burner.

It is, accordingly, still another object of this invention to provide a simple and effective structure providing a separate safety valve structure controlling the flow of fuel to the pilot burner.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

Figure 1:
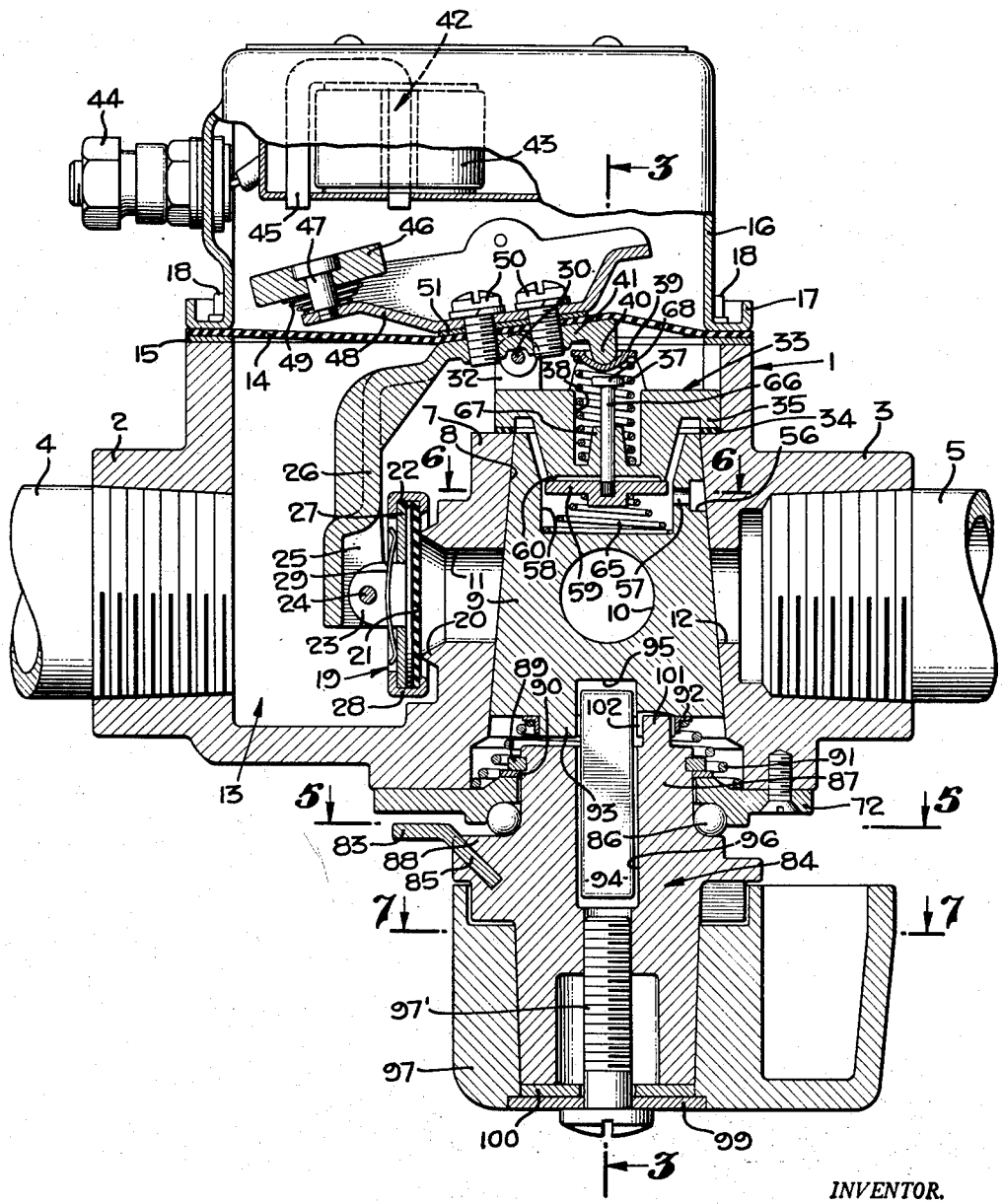
Figure 1 is a vertical sectional view of a valve incorporating the invention, the valve being shown in fully closed position.

Figs. 5, 6, and 7 are fragmentary horizontal sectional views, taken, respectively, along planes corresponding to lines 5—5, 6—6, and 7—7 of Fig. 1; and Fig. 8 is a view, mainly diagrammatic, of an installation illustrating the valve in use.

The valve body 1 is provided with an inlet boss 2 and an outlet boss 3. Both of these bosses are internally threaded for the accommodation of the conduits 4 and 5. As shown most clearly in Fig. 8, the conduit 5 is intended to be connected to a main burner. If desired, ahead of the conduit 4 is an automatic valve 6, which responds, as indicated, to the demand of the space to be heated, as by the aid of a thermostat, to permit passage of fuel to the conduit 4.

The body 1 is provided with an integral portion 7 in which an upwardly tapered plug seat 8 is provided for rotary plug closure 9. This plug closure 9 has a transverse port 10 adapted, when the valve is open, to be aligned with inlet port 11 and outlet port 12 formed in the part 7 of the body 1. When the plug 9 is turned through ninety degrees from the position shown in Figs. 1 and 2, these ports 10, 11, and 12 are aligned; and, if the safety valve is open, fuel can then pass to the main burner.

Ahead of the port 11, a chamber 13 is formed in body 1. This chamber is closed by a diaphragm 14 extending over the upper open end of the body 1. A gasket 15 is interposed between the body 1 and the diaphragm 14. A casing 16 has a flange 17, by the aid of which it may be fastened, as by cap screws 18, to the top of body 1. In this way, the chamber 13 is in communication only with the inlet 2 and the port 11.

Within the chamber 13 a safety valve closure structure 19 is arranged to cooperate with a valve seat 20. This seat 20 is formed as a narrow raised portion around the inlet port 11. It is, accordingly, necessary that this safety valve closure 19 be in the open position of Fig. 2, and the plug 9 in the position aligning ports 10, 11, and 12 in order that fuel may pass to the main burner. The arrangement is such, as in the prior application hereinabove referred to, that this safety valve closure 19 automatically closes when the pilot flame at the pilot burner fails.

The closure structure 19, as shown most clearly in Fig. 1, includes a resilient closure proper 21, having a backing plate 22. This backing plate is provided with an ear 23. The ear 23 is pivotally mounted by a pin 24 extending across the depending sides 25 of a lever 26. The ear 23 passes through a slot in another backing plate 27. This backing plate 27, plate 22, and the closure 21, are held together by the aid of a flanged ring 28. The inner edge of the ring 28 is turned inwardly during assembly, so as to encompass the edges of parts 27, 22, and 21.

A flat spring member 29 engages the exposed surface of the plate 27, and has a slot for the passage of the ear 23. Its bowed central portion is confined by the inner edges of the sides 25.

Pivot pins 30 (see, also, Figs. 3 and 4) are provided for pivotally mounting the lever 26. These pivot pins are accommodated in the ears 31 and 32. These ears 31 and 32 are, in this instance, shown as integral with a member 33 that covers the upper open end of the seat 8. A gasket 34 is interposed between the part 7 and the downwardly directed flange 35 of the member 33. Cap screws 36 (Fig. 3) are provided for clamping the member 33 in place.

The lever 26 is biased to the closing position of Fig. 1 by the aid of a compression spring 37. This compression spring 37 is seated at the bottom of a recess 38 in member 33. Its upper end engages a cup member 39. Within this cup member is a downwardly extending projection 40 depending from the arm 41 of the lever 26. Accordingly, in order to hold the safety valve closure structure 19 in the open position of Fig. 2, a sufficient force must be provided to overcome the force of spring 37.

Figure 2:
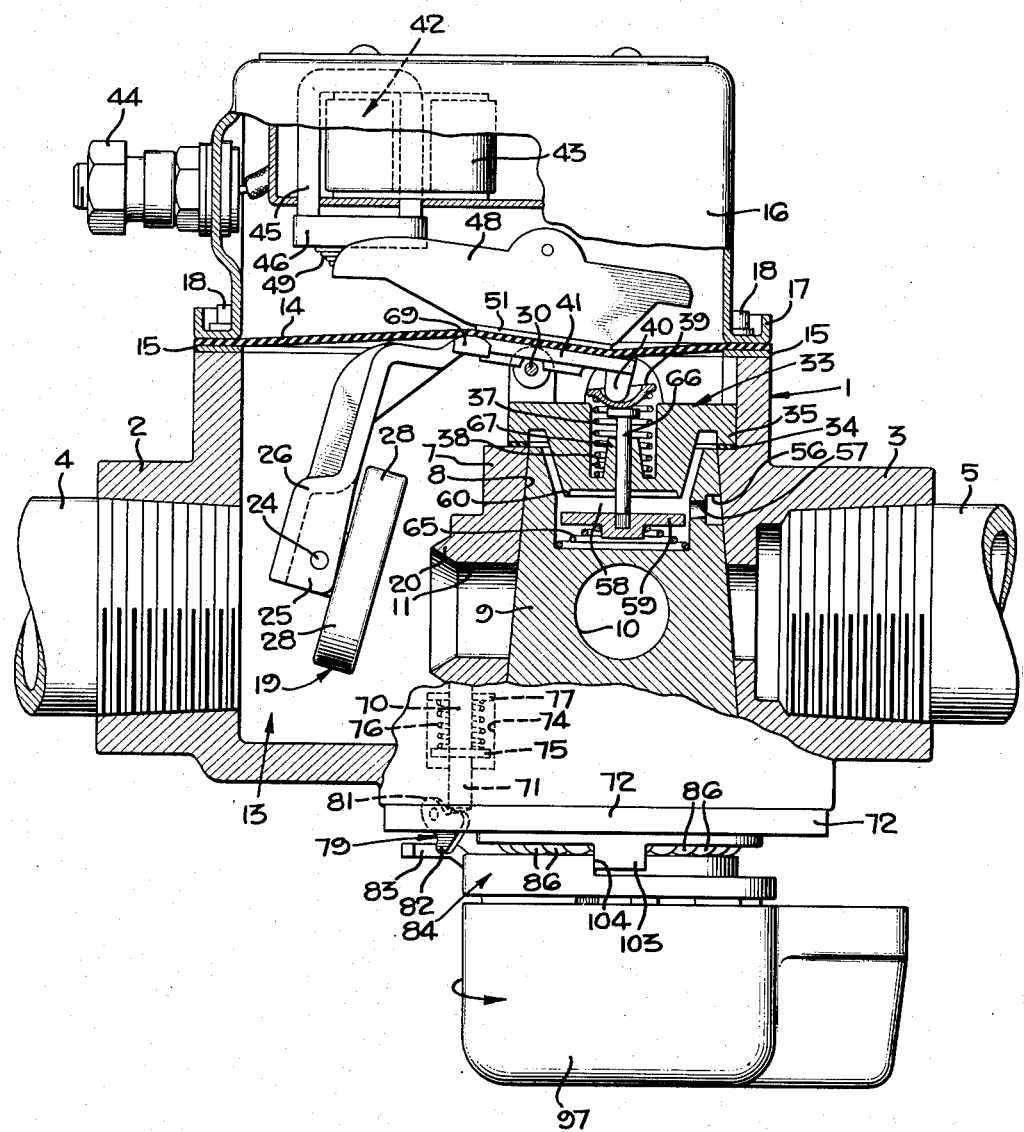
Fig. 2 is a view similar to Fig. 1, partly in elevation, showing the safety valve opened, the main valve being closed.

In order to hold the lever 26 in the open position of Fig. 2, while the pilot flame is in existence, use is made of an electromagnet structure 42 appropriately mounted within the casing 16. This electromagnet structure includes a coil 43. The terminals of this coil 43 are connected to the posts 44 insulatingly mounted on a wall of casing 16. These terminals in turn are connected to a thermocouple influenced by the pilot flame.

The coil 43 surrounds one leg of a U-shaped core 45, the polar faces of which extend downwardly.

These polar areas are adapted to cooperate with a disc armature 46 loosely mounted on a post 47. This post 47 in turn is fastened to the left-hand end of an arm 48 having side flanges. A light compression spring 49 is interposed between the arm 48 and the lower surface of the armature 46, in order to urge the armature 46 into intimate contact with the faces of the core 45 as the arm 48 travels upwardly toward the electromagnet 42. Due to the loose mounting of the armature 46, this armature is closely aligned with the polar areas of core 45, and makes intimate contact therewith.

The arm 48 is mechanically connected to the lever 26, and is located within the casing 16. For this purpose, screws 50 pass through the lower portion of the arm 48 and are threaded into the lever 26. The diaphragm 14 is appropriately apertured for this purpose, and a plate 51 is interposed between the arm 48 and the diaphragm 14 in order to equalize the pressure exerted by these screws.

While the pilot flame is in existence, electromagnet 43 is supplied with power from the thermocouple disposed at the pilot flame. When the thermocouple cools, due to the extinguishment or failure of the pilot flame for any reason, the electromagnet 43 is de-energized and the safety valve structure is urged to the position of Fig. 1 by spring 37. This stops the flow of fuel to the main burner.

The flow of fuel to the pilot burner is also interrupted, so that there is a complete shut-off of fuel.

In order to accomplish this result, a supplemental valve structure is incorporated in the valve, providing for the passage of pilot fuel separate from the passageways for the supply of fuel to the main burner. This safety valve structure is shown most clearly in Figs. 1, 2, and 3.

Thus, the body 1 is provided with transverse ports 52 and 53, to which conduits 54 and 55 are connected. Conduit 54 is connected to a continuously open passage to the source of fuel in the automatic valve 6 (Fig. 8). Conduit 55 is connected to the pilot burner. Port 52 leads to an annular groove or port 56 in the periphery of plug 9 (see, also, Fig. 6). This annular port 56 has an angular extent of substantially 180°. A radial port 57 (Figs. 1 and 6) establishes communication with the annular port 56 and the space 58 formed by the hollow upper extension of the plug 9 and the cover member 33. Accordingly, for all operating positions of the plug 9, the inlet port 52 is in communication with the space 58.

Figure 3:
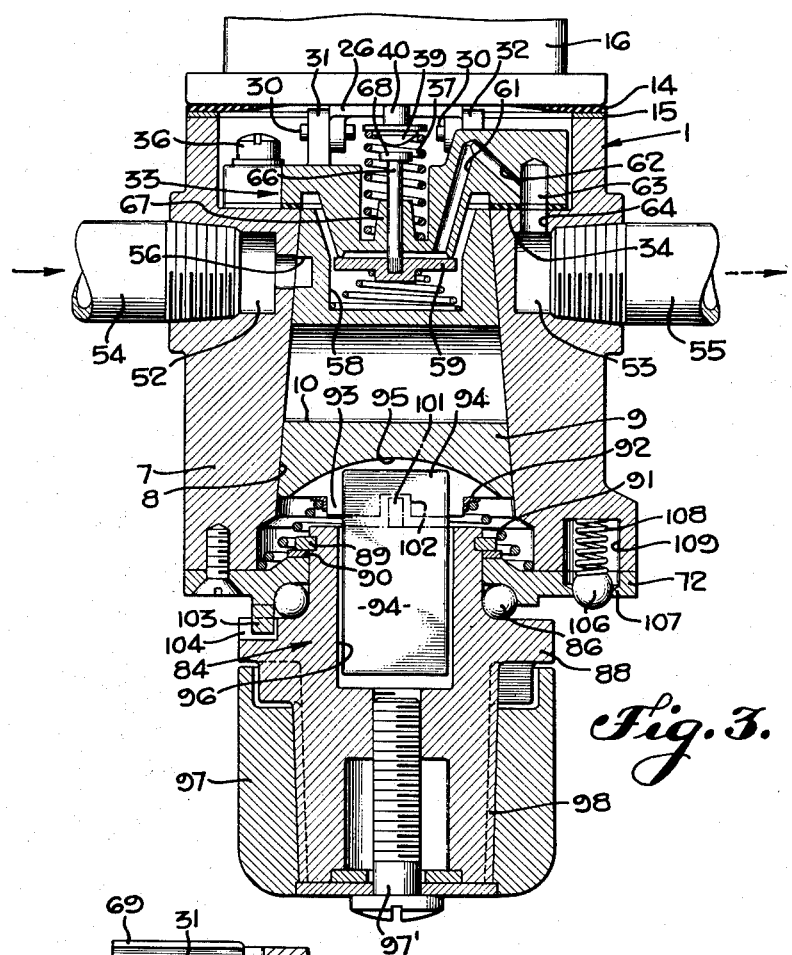
Fig. 3 is a vertical section, taken along a plane corresponding to line 3—3 of Fig. 1.

Communication between this space 58 and the port 53, however, can be established only upon opening of a supplemental valve closure member 59. This supplemental valve closure member is located in the space 58, and cooperates with a narrow, knife-edge seat 60 formed on the lower side of the cover member 33. Opening in the lower side of the cover member 33 is a port 61 (Fig. 3) communicating with a port 62 formed in this cover member. This port 62 in turn communicates with a vertical port 63. This vertical port 63 is in alignment with a passage 64 communicating with the outlet 53 through an aperture in gasket 34. This outlet port 53 can communicate with the space 58 only by way of the passage 64, ports 63, 62, and 61. When the valve closure member 59 is closed, as shown in Figs. 1 and 3, this flow of fuel between conduits 54 and 55 is interrupted.

The closure member 59 is biased to closed position by a light compression spring 65 seated in the hollow portion of the plug 9. In order to urge the closure 59 downwardly to the open position of Fig. 2, use is made of a stem 66 which passes through a boss 67 formed in the bottom of the member 33. This stem 66 is provided with a head 68 that is in the path of movement of the cup 39. Accordingly, when the lever 26 is moved in a clockwise direction, the projection 40 urge the cup 39 downwardly into contact with the head 68, moving the closure 59 downwardly and opening the passageway for the pilot gas. However, in the closed position of Fig. 1, closure 59 is seated; and, accordingly, the flow of fuel to the pilot burner is also interrupted.

In resetting the valve from the closed position of Fig. 1, it is necessary manually to move the lever 26 so as to bring the armature 46 into contact with the core 45. Then this opens the pilot fuel passageways, as well as the safety valve port 11; and the pilot flame may then be lighted while holding the safety valve in the open position. In a short time, the pilot flame generates sufficient power to hold the armature 46 in attracted position, and the manual operator may be released.

The arrangement is such, as described in the prior application hereinabove referred to, that this resetting operation can take place only when plug valve 9 is in closed position. The manner in which this is accomplished will now be described.

Figure 4:
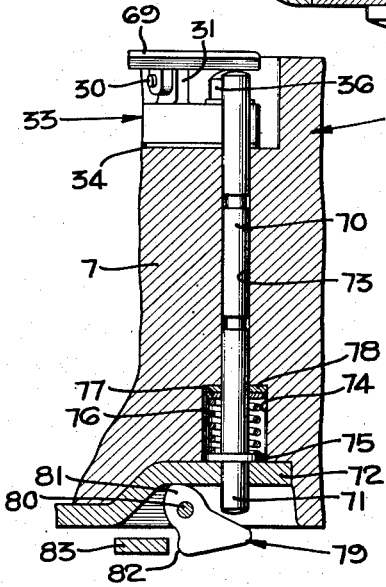
Fig. 4 is a fragmentary detail vertical section, illustrating the operating parts for opening the safety valve in the process of resetting.

Extending transversely of the lever 26 is an operating extension 69 (Figs. 2 and 4). This extension is arranged to be raised by a plunger rod 70 (Figs. 2 and 4). This plunger is guided in a long bore 73 of the body 1, and its lower end 71 extends through a cover plate member 72 of the body 1, and below the plug seat 8. Rod 70 may be provided with several annular grooves for a lubrication packing, such as silicone grease. The guiding bore 73 for the rod 70 communicates at its lower end with an enlarged recess 74. A collar 75 is fastened to the rod 70 to limit downward movement of this rod. A compression spring 76 is interposed between the collar 74 and washer 77. Above the washer 77 there is a packing washer 78.

A lever 79 is pivotally mounted on a pin 80 supported by the member 72. This lever 79 is disposed in a cavity in the lower side of member 7. It has an arm 81 which contacts the lower surface of the member 72 to limit its downward movement. It also has an operating projection 82 which is adapted to be moved by an operating arm 83 (see Figs. 1 and 2). This arm 83 is mounted for movement about the axis of the plug 9; and, upon sufficient movement, the lever 79 is moved in a counter-clockwise direction, as shown in Fig. 4. This causes the rod 70 to rise and to move the lever 26 in a clockwise direction for opening the safety valve.

The operating arm 83, as shown most clearly in Figs. 1 and 5, is attached to an operator 84, as by having a slanting portion 85 embedded, as by casting, in a slot in this operator 84.

The operator 84 is rotatably mounted by the aid of a plurality of ball bearings 86. As shown most clearly in Fig. 1, the inner race of ball bearing 86 is formed by the rounded shoulder between the upwardly directed extension 87 of the operator 84 and the flange 88 of this member. The outer race is formed on the lower surface of the member 72. The operator 84 is thus supported for angular movement about the axis of plug 9.

The operator 84 is restrained against axial movement by the aid of a split spring ring 89 which engages a groove near the upper end of the operator 84. A washer 90 is interposed between this split ring and the upper surface of the member 72.

In order to urge the plug 9 resiliently against its seat, a compression spring 91 is provided. This compression spring may be of conical configuration. Its lower, larger end is disposed on the top surface of the member 72. The upper end of spring 91 engages a flanged ring 92 loosely mounted around the downwardly projecting boss 93 of the plug 9.

In order to couple the operator 84 to the plug 9, a coupling member 94 is provided. This is of rectangular section. Its upper end fits loosely in an arcuate slot or recess 95 milled in the bottom of the plug 9. Its lower end is disposed loosely in a rectangular recess 96 of the operator 84.

Due to this loose coupling, a lost motion of about five degrees may be secured between the operator 84 and the plug 9 when the operator 84 is angularly moved. The operator 84, due to its mounting, is confined for rotation about the axis of plug 9. Accordingly, when the operator 84 is rotated, the loose coupling 94 accommodates itself so that there is no binding between the parts, or any asymmetrical application of torque transmitted from the operator 84 to the plug 9. This feature is of considerable importance, for it is difficult to ensure absolutely accurate alignment of the axes of rotation of plug 9 and operator 84. If the coupling 94 were rigidly attached to either the operator or the plug, with lost motion between them, a transverse resultant force would necessarily result. The present arrangement eliminates this possibility.

A handle 97 (see, also, Figs. 5 and 7) is firmly attached to the operator 84. For this purpose, the operator 84 has a pair of splines 98 (Fig. 7) arranged on the tapered downwardly extending end of the operator. These splines are disposed in corresponding slots in the handle 97. An attachment screw 97' is threaded into the operator 84, and its head engages the plate 99 in the lower surface of the handle 97. Another washer 100 may be interposed between the lower end of the operator 84 and this handle.

The angular arrangement of the splines 98 ensure that the handle 97 may be connected to the operator 84 only in one manner. Furthermore, the operator 84 has an upwardly directed projection 101 (Figs. 1 and 5) that is adapted to engage a cross slot 102 intersecting the slot 95. In this way, the operator 84 can be assembled in only one way with respect to the plug 9.

The relative angular position of the arm 83 is such that the handle 97 must be turned in a direction beyond full closing position of the plug 9 (permitted by the loose coupling) in order to actuate the reset lever 79. This is indicated in Figs. 2 and 5. As viewed from above, the handle 97 must be rotated in a counterclockwise direction beyond full closing position in order to bring the arm 83 into operating position for resetting. When the handle 97 is released, the spring 76 (Fig. 4) returns the rod 70 to its lowermost position, and at least a part of the lost motion between the operator 84 and the plug 9 is taken up. In this way, the friction between the plug 9 and its seat 8 is ineffective to restrain the handle 97 and operator 84 in the resetting position when the handle is released.

The movement of the operator 84 is confined to slightly more than 180° by the provision of a stop 103 (Figs. 2 and 5). This stop is formed integrally with the member 72 and cooperates with the end walls 104 and 105 formed on the upper side of the operator 84.

Assuming that the valve is in the closed position of Fig. 1, the handle 97 and the operator 84 are in the position of Fig. 5. In order to reset the device, the handle 97 is moved in a counterclockwise direction, as viewed in Fig. 5. This brings the arm 83 against the lever 79, as illustrated in Fig. 2. Thereby, the rod 70 is moved upwardly, and the lever 26 is moved in a clockwise direction toward the open position of Fig. 2. Thereafter, the pilot flame may be ignited, and then the handle 97 may be released. The spring 76 causes the return of the handle to the position of Fig. 1. However, the safety valve lever 26 is retained by the electromagnet 42. Now, handle 97 may be moved in a clockwise direction, as viewed in Fig. 5, to open the plug valve. The lost motion between the operator 84 and plug 9 is first taken up, and then the plug 9 is rotated to ninety degrees to align the ports 10, 11, and 12. The main burner is then ignited by the pilot flame, and the burner is in full operation.

The resetting movement of the handle 97 is also effective to open the pilot gas valve closure 59.

Should it be desired to provide a seasonal shut-off, the handle 97 may be turned in a clockwise direction, as viewed in Fig. 5, through 180° from that position. When this is accomplished, the annular groove 56 will be out of communication with the port 52; and, accordingly, the flow of fuel to the pilot burner will be interrupted by this means.

A spring-pressed ball detent 106 (Figs. 3, 5, and 6) is provided to cooperate with the arm 83. This arm 83 must travel through complete plug opening movement before it contacts the ball 106. Beyond that, the operator is warned that the resistance encountered, due to the ball 106, that passage beyond that point corresponds to a seasonal shut-off operation.

The ball 106, as shown most clearly in Fig. 3, is urged against a seat 107 in the member 72 by the spring 108 that is received in a recess 109 of the body 1.

The inventor claims:

1. In a valve structure: a valve body; a rotary plug closure seated in said body; said plug and body having ports capable of being aligned when the plug in a definite position; a safety valve closure cooperating with one of said body ports to interrupt flow through the plug; there being a pair of supplemental ports in the body; said plug having a hollow extension forming a space intermediate and adapted to communicate with said supplemental ports; and a valve structure in said space and having a movable valve member for controlling passage of fluid between one of the supplemental ports and said space; means for moving the safety valve closure to open position; and means operated upon movement of the safety valve to open position for moving said movable valve member to open position.

2. In a valve structure: a valve body; a rotary plug closure seated in said body; said plug and body having ports capable of being aligned when the plug is in a definite position; a safety valve closure cooperating with one of said body ports to interrupt flow through the plug; there being a pair of supplemental ports in the body; said plug having a hollow extension forming a space intermediate and adapted to communicate with said supplemental ports; and a valve structure in said space having a movable valve member for controlling passage of fluid between one of the supplemental ports and said space; said plug having an annular port that controls the flow of fluid between the other supplemental port and said space; means for moving the safety valve closure to open position; and means operated upon movement of the safety valve to open position for moving said movable valve member to open position.

3. In a valve structure: a valve body; a rotary plug closure seated in said body; said plug and body having ports capable of being aligned when the plug is in a definite position; a safety valve closure cooperating with one of said body ports to interrupt flow through the plug; there being a pair of supplemental ports in the body; said plug having a hollow extension forming a space intermediate and adapted to communicate with said supplemental ports; and a valve structure in said space having a movable valve member for controlling passage of fluid between one of the supplemental ports and said space; said plug having an annular port that controls the flow of fluid between the other supplemental port and said space; and common means for opening the said safety valve closure and said movable valve member; the angular extent of said annular port being such that the plug may rotate in one direction to close the plug valve without interrupting flow of fluid between said other supplemental port and the annular port; and the plug may rotate in the other direction to close the plug valve, as well as to interrupt communication between the annular port and said other supplemental port.

4. In a valve structure: a rotary ported plug; a body providing a seat for the plug, as well as ports opening into the seat whereby rotation of the plug can establish and interrupt communication between the ports; said body having a wall defining a chamber into which one of said ports open; means defining a supplemental passage through the valve body separate from said ports; said plug having a hollow portion adapted to be in communication with said passage; means forming a valve seat interposed in said passage and extending into said hollow portion; a first valve closure in the hollow portion and cooperating with the seat; a second valve closure in the chamber for interrupting communication between the said one port and the chamber; means for moving said second valve closure to open position; and means operated upon movement of said second valve closure to open position for moving said first valve closure to open position.

5. In a valve structure: a rotary ported plug; a body providing a seat for the plug, as well as ports opening into the seat whereby rotation of the plug can establish and interrupt communication between the ports; said body having a wall defining a chamber into which one of said ports opens; means defining a supplemental passage through the valve body separate from said ports; said plug having a hollow portion adapted to be in communication with said passage; means forming a valve seat interposed in said passage and extending into said hollow portion; a first valve closure in the hollow portion and cooperating with the seat; a second valve closure in the chamber for interrupting communication between the said one port and the chamber; a lever carrying said second valve closure; means for moving said lever; and means operated upon opening movement of said lever for moving said first valve closure to open position.

6. In a valve structure: a rotary ported plug; a body providing a seat for the plug, as well as ports opening into the seat whereby rotation of the plug can establish and interrupt communication between the ports; said body having a wall defining a chamber into which one of said ports opens; means defining a supplemental passage through the valve body separate from said ports; said plug having a hollow portion adapted to be in communication with said passage; means forming a valve seat interposed in said passage and extending into said hollow portion; a first valve closure in the hollow portion and cooperating with the seat; a second valve closure in the chamber for interrupting communication between the said one port and the chamber; and a manual operator for the plug and for moving both the closures to open position, said operator being so arranged that the plug is in closed position before the closures are opened.

7. In a valve structure: a rotary plug having a through port; one end of the plug having a recess separate from said through port; a valve body providing a seat for the plug, said seat having ports cooperating with the plug port; said body having supplemental ports adapted to communicate with said recess; means forming a stationary wall for the recess, said wall defining a passage from the recess to one of the supplemental ports; means forming a supplemental valve seat for said one of the supplemental ports; a valve closure biased to closed position with respect to said supplemental valve seat to control said passage; and a common means for moving the plug to and from open position and correspondingly moving the valve closure to open only when the plug is in closed position.

8. In a valve structure: a rotary plug having a through port; one end of the plug having a recess; a valve body providing a seat for the plug, said seat having ports cooperating with the plug port; said body having supplemental ports adapted to communicate with said recess; means forming a stationary wall for the recess, said wall defining a passage from the recess to one of the supplemental ports; means forming a supplemental valve seat for said one of the supplemental ports; a valve closure biased to closed position with respect to said supplemental valve seat to control said passage; and a common means for moving the plug to and from open position and correspondingly moving the valve closure to open when the plug is in closed position; said plug having an annular port controlling the flow of fluid into the recess, said port having an angular extent such that the flow is uninterrupted when the plug is turned to closed position in a direction to open the valve closure, and the flow is interrupted when the plug is turned in the opposite direction to close the plug.

9. In a valve structure: a rotary ported plug; a body providing a seat for the plug, as well as ports opening into the seat whereby rotation of the plug can establish and interrupt communication between the ports; said body having a wall defining a first chamber into which one of said ports opens; means defining a supplemental passage through the valve body separate from said ports; said plug having a hollow portion adapted to be in communication with said passage; means forming a valve seat interposed in said passage and extending into said hollow portion; a first valve closure in the hollow portion and cooperating with the seat; a second valve closure in the chamber for interrupting communication between the said one port and the chamber; a handle structure coupled to the plug for rotating the plug; and means operated by the handle structure for moving the valve closures to open position only when the plug is moved to one of its closed positions.

10. In a valve structure: a rotary ported plug; a body providing a seat for the plug, as well as ports opening into the seat whereby rotation of the plug can establish and interrupt communication between the ports; said body having a wall defining a first chamber into which one of said ports opens; means defining a supplemental passage through the valve body separate from said ports; said plug having a hollow portion adapted to be in communication with said passage; means forming a valve seat interposed in said passage and extending into said hollow portion; a first valve closure in the hollow portion and cooperating with the seat; a second valve closure in the chamber for interrupting communication between the said one port and the chamber; a handle structure coupled to the plug for rotating the plug; means operated by the handle structure for moving the valve closures to open position only when the plug is moved to one of its closed positions; said valve closures being biased to closed position; and an electromagnet for holding said valve closures in open position against said bias.

11. In a valve structure: a rotary plug having a port therein; a valve body defining a seat for the plug; an operator for angularly moving the plug; means confining rotation of the operator on an axis corresponding substantially to the axis of the plug; and a coupling member between said operator and the plug, and having a lost motion with respect to the operator and with respect to the plug.

12. In a valve structure: a rotary plug having a port therein; a valve body defining a seat for the plug; an operator for angularly moving the plug; means confining rotation of the operator on an axis corresponding substantially to the axis of the plug; said plug and operator having opposed recesses; a coupling member loosely accommodated in said recesses to form a lost motion connection between said plug and said operator; and resilient means for urging the operator toward plug-opening direction.

13. In a valve structure: a rotary plug having a port therein; a valve body defining a seat for the plug and having ports opening in said seat; an operator for angularly moving the plug; means confining rotation of the operator on an axis corresponding substantially to the axis of the plug; a valve closure biased to closed position and cooperating with one of the ports in the body; a coupling member loosely connected to the plug and the operator to form a lost motion connection between said plug and said operator; means moved by the operator to open said valve closure upon movement of the operator to a closing position for the plug; and resilient means for urging the operator toward plug-opening direction.

14. In a valve structure: a rotary plug having a port therein; a valve body defining a seat for the plug and having ports opening in said seat; an operator for angularly moving the plug; means confining rotation of the operator on an axis corresponding substantially to the axis of the plug; a valve closure biased to closed position and cooperating with one of the ports in the body; said operator and plug having opposed recesses; a coupling member loosely accommodated in said recesses to form a lost motion connection between said operator and said plug for transmitting motion from the operator to the plug; means moved by the operator to open said valve closure upon movement of the operator to a closing position of the plug; and resilient means for urging the operator toward plug-opening direction.

15. In a valve structure: a rotary plug having a port therein; a valve body defining a seat for the plug and having ports opening in said seat; an operator for angularly moving the plug; means confining rotation of the operator on an axis corresponding substantially to the axis of the plug; a valve closure biased to closed position and cooperating with one of the ports in the body; a coupling member loosely connected to the plug and the operator to form a lost motion connection between said operator and said plug; means moved by the operator to open said valve closure upon movement of the operator to a closing position for the plug; condition responsive means for holding said valve closure in open position; and resilient means for urging the operator toward plug-opening direction.

16. In a valve structure: a rotary plug having a port therein; a valve body defining a seat for the plug; an operator for angularly moving the plug; means confining rotation of the operator on an axis corresponding substantially to the axis of the plug; said plug having a transverse recess at one end; said operator having a corresponding recess facing the plug recess; a coupling member loosely accommodated in said recesses to form a lost motion connection between said operator and said plug; and resilient means for urging the operator toward plug-opening direction.

17. In a valve structure: a rotary plug having a port therein; a valve body defining a seat for the plug and having ports opening in said seat; an operator for angularly moving the plug; means confining the rotation of the operator on an axis corresponding substantially to the axis of the plug; a valve closure biased to closed position and cooperating with one of the ports in the body; said plug having a transverse recess at one end; said operator having a corresponding recess facing the plug recess; a coupling member loosely accommodated in said recesses to form a lost motion connection between said operator and said plug; means moved by the operator to open said valve closure upon movement of the operator to a closing position for the plug; and resilient means for urging the operator toward plug-opening direction.

18. In a valve structure: a rotary plug having a port therein; a valve body defining a seat for the plug and having ports opening in said seat; an operator for angularly moving the plug; means confining rotation of the operator on an axis corresponding substantially to the axis of the plug; said body having a chamber; one of the body ports opening in said chamber; a movable valve closure in the chamber and biased to close the said one of the ports; a coupling member loosely connected to the plug and the operator to form a lost motion connection between said operator and said plug; means carried by the operator to open said valve closure upon movement of the operator to a closing position for the plug; and resilient means for urging the operator toward plug-opening direction.

19. In a valve structure: a rotary plug having a port therein; a valve body defining a seat for the plug and having ports opening in said seat; an operator for angularly moving the plug; means confining rotation of the operator on an axis corresponding substantially to the axis of the plug; said body having a chamber; one of the body ports opening in said chamber; a movable valve closure in the chamber and biased to close the said one of the ports; said plug having a transverse recess at one end; said operator having a corresponding recess facing the plug recess; a coupling member loosely accommodated in said recesses to form a lost motion connection between said operator and said plug; means moved by the operator to open said valve closure upon movement of the operator to a closing position of the plug; and resilient means for urging the operator toward plug-opening direction.

20. In a valve structure: a rotary plug having a port therein; a valve body defining a seat for the plug and having ports opening in said seat; an operator for angularly moving the plug; means confining rotation of the operator on an axis corresponding substantially to the axis of the plug; said body having a chamber; one of the body ports opening in said chamber; a movable valve closure in the chamber and biased to close the said one of the ports; said plug having a transverse recess at one end; said operator having a corresponding recess facing the plug recess; a coupling member loosely accommodated in said recesses to form a lost motion connection between said operator and said plug; means moved by the operator to open said valve closure upon movement of the operator to a closing position of the plug; condition responsive means for holding said valve closure in open position; and resilient means for urging the operator toward plug-opening direction.

21. In a valve structure: a rotary plug having a port therein; a valve body defining a seat for the plug and having ports opening in said seat; said body having a wall defining a chamber; one of said body ports opening in said chamber; a pivoted lever in the chamber; a valve closure carried by an arm of the lever and cooperating with the said one of the body ports to close the port; means biasing said lever to closed position; said body having passages extending into a space defined by a hollow portion of the plug; said hollow space being separate from said body ports; and supplemental valve means controlling flow of fluid through the passages, said valve means including a valve seat extending into the hollow portion, a valve stem, a valve closure in said hollow portion and carried by the stem, and a spring acting to keep the valve means closed, the lever having another arm for engaging the stem to open said supplemental valve means when the lever moves to open the port in said chamber.

22. In a valve structure: a rotary plug having a port therein; a valve body defining a seat for the plug; said body having ports opening in said seat; a valve closure biased to close one of said ports; an operator for angularly moving the plug; said operator and the plug having a substantially common axis of rotation; means confining rotation of the operator to angular movement about its axis; and a coupling member between said operator and the plug, said coupling member having substantial lost motion with respect to the operator and with respect to the plug; and means moved by the operator to move said valve closure to open position upon movement of the operator to a plug valve closing position; the extent of movement of said valve closure moving means substantially corresponding to the extent of said lost motion.

23. In a valve structure: a rotary plug having a port therein; a valve body defining a seat for the plug; said body having ports opening in said seat; a valve closure biased to close one of said ports; an operator for angularly moving the plug; said operator and the plug having a substantially common axis of rotation; means confining rotation of the operator to angular movement about its axis; and a coupling member between said operator and the plug, said coupling member having substantial lost motion with respect to the operator and with respect to the plug; means moved by the operator to move said valve closure to open position upon movement of the operator to a plug valve closing position; and means biasing said valve closure moving means toward inactive position; the extent of movement of said valve closure moving means substantially corresponding to the extent of said lost motion.

24. In a valve structure: a rotary plug having a port therein; a valve body defining a seat for the plug and having a port opening in said seat; a pivoted lever; a valve closure carried by an arm of the lever and cooperating with said body port opening to close the said port opening; said body having passages extending into a space defined by a hollow portion of the plug; and supplemental valve means controlling flow of fluid through the passages, said valve means including a supplemental valve seat, a closure cooperating with said supplemental valve seat, and located in said space, said lever being engageable with said valve means to open said valve means upon movement of said lever to open said port.

References Cited in the file of this patent

UNITED STATES PATENTS

| | | |
|---|---|---|
| 1,805,668 | Kelley | May 19, 1931 |
| 2,305,848 | Dobler | Dec. 22, 1942 |
| 2,313,890 | Ray | Mar. 16, 1943 |
| 2,403,611 | Ray | July 9, 1946 |
| 2,472,384 | Ray | June 7, 1949 |

FOREIGN PATENTS

| | | |
|---|---|---|
| 5,008 | Great Britain | 1906 |
| 114,159 | Great Britain | 1919 |
| 522,016 | France | Mar. 18, 1921 |
| 865,296 | France | May 17, 1941 |